US006441785B1

(12) United States Patent
Rosen et al.

(10) Patent No.: US 6,441,785 B1
(45) Date of Patent: Aug. 27, 2002

(54) LOW SIDELOBE ANTENNA WITH BEAMS STEERABLE IN ONE DIRECTION

(75) Inventors: Harold A. Rosen, Santa Monica; Steven O. Lane, Rolling Hills Estates, both of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/550,785

(22) Filed: Apr. 17, 2000

(51) Int. Cl.[7] .............................. G01S 3/16; G01S 3/28

(52) U.S. Cl. ........................ 342/383; 342/158; 342/354

(58) Field of Search ................................ 342/372, 373, 342/380, 383, 157, 158, 354

(56) References Cited

U.S. PATENT DOCUMENTS 4,418,350 A 11/1983 Rosen
4,849,763 A 7/1989 DuFort
5,233,358 A 8/1993 Murphy
5,579,021 A 11/1996 Lee
5,712,642 A 1/1998 Hulderman
6,184,828 B1 * 2/2001 Shoki ......................... 342/372

* cited by examiner

*Primary Examiner*—Theodore M. Blum
(74) *Attorney, Agent, or Firm*—Gates & Cooper LLP

(57) ABSTRACT

An antenna for scanning beams in only one common angular direction or angular path includes feed elements each providing a component beam and fixed beam combiners for combining the component beams into fixed beams. The fixed beam combiners combine the component beams in a first angular direction to form the fixed beams. Variable beam combiners combine the fixed beams into scanning beams. The variable beam combiners combine the fixed beams into the scanning beams to scan the scanning beams in a second common angular direction.

21 Claims, 5 Drawing Sheets

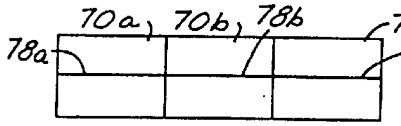
FIG. 6B
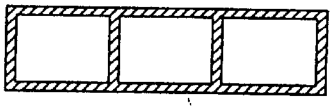
FIG. 6E
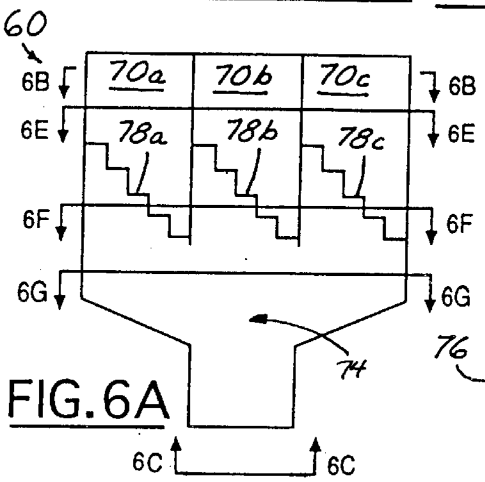
FIG. 6A
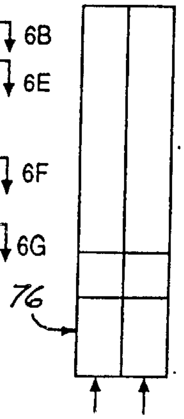
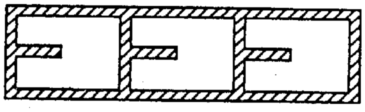
FIG. 6F
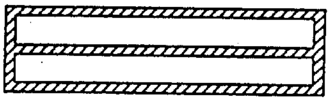
FIG. 6G
FIG. 6D
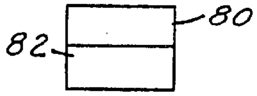
FIG. 6C
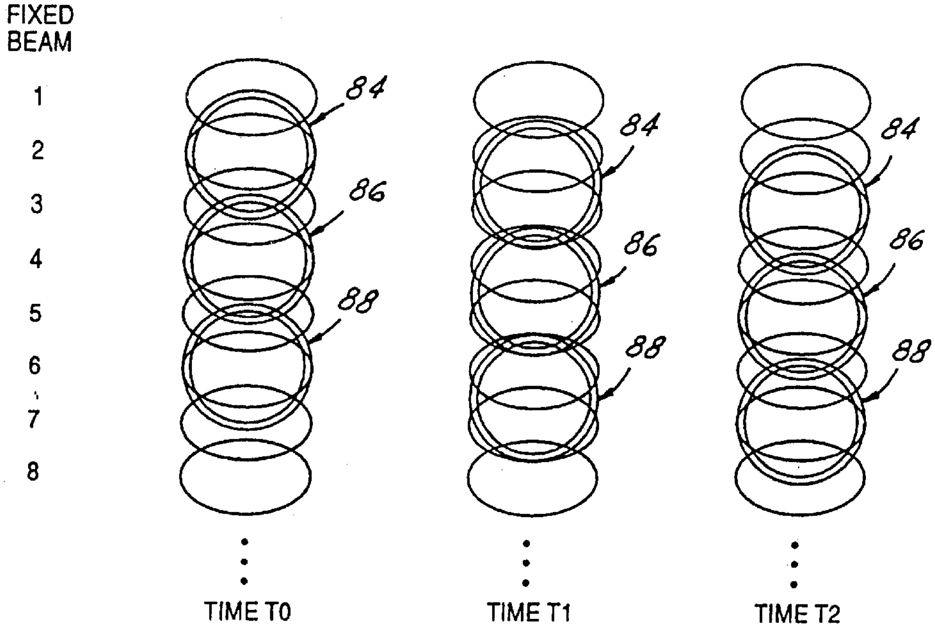
FIG. 7

LOW SIDELOBE ANTENNA WITH BEAMS STEERABLE IN ONE DIRECTION

TECHNICAL FIELD

The present invention relates generally to antennas and, more particularly, to an antenna that scans multiple beams in one direction.

BACKGROUND ART

Satellite systems are currently utilized for communication between potentially distant points on the surface of the earth. For example, telephone networks employ such systems to facilitate communication between widely spaced mobile users. In certain such satellite communication systems a satellite is in a non-geosynchronous earth orbit to provide service to a fixed coverage area. These non-geosynchronous satellites often include an antenna having sufficient beam-width to encompass the entire coverage area. Such non-geosynchronous satellites allow beams to be scanned in one direction that is predominantly a line which may be slightly curved. The beams are scanned to follow the motion of users in fixed positions on the surface of the earth as seen from the nongeosynchronous satellite flying over the users. From the point of view of the satellite, the users are moving so the beams must be scanned to follow the users, or to follow specific areas on the surface of the earth called cells.

Wide beamwidth systems such as that mentioned above generally include certain undesirable features. For instance, the output power of the satellite may be insufficient to adequately illuminate large coverage regions. This situation may be remedied by including more powerful amplifiers on board the satellite for providing increased power to radiating elements of a satellite antenna. However, such enhancements increase the cost of constructing and launching the satellite.

Consequently, alternative antennas such as multiple beam antennas have been developed which address the difficulties associated with conventional wide beamwidth antennas. A multiple beam antenna provides a plurality of narrowly focused beams targeted at individual regions. The output power of a satellite generating these narrow beams is used more efficiently by being directed only to specific regions within a coverage area.

Typically, a multiple beam antenna is capable of electronically scanning the beams along any angular direction to move the beams across two dimensions within the coverage area. To provide the capability of scanning beams across both of the two angular directions, the known multiple beam antennas include a great number of feeds whose inputs are amplitude/phase weighted and then summed by beam combiners to form each beam.

A problem with known multiple beam antennas is that they include many more beam combiners and amplitude phase weighting circuits than required if the beams were required to move along only one angular direction in a straight line or along an angular path that is slightly curved.

DISCLOSURE OF INVENTION

Accordingly, it is an object of the present invention to provide an antenna that scans multiple beams along only one angular direction.

It is, accordingly, another object of the present invention to provide an antenna that scans multiple beams along an angular path that is slightly curved.

It is another object of the present invention to provide a multiple beam antenna which scans the beams independently of one another along a common angular direction or angular path.

It is a further object of the present invention to provide a multiple beam antenna which scans the beams along only one angular direction or angular path with each beam being able to be scanned up to at least +/−0.7 beamwidths.

It is still another object of the present invention to provide an antenna that forms multiple low sidelobe beams of one or two polarizations and scans them independently of one another along a common angular direction or angular path.

In carrying out the above objects and other objects, the present invention provides an antenna for scanning beams in only one common angular direction. The antenna includes a plurality of feed elements each providing a component beam, and a plurality of fixed beam combiners for combining the component beams into fixed beams. The plurality of fixed beam combiners combine the component beams in a first angular direction to form the fixed beams. A plurality of variable beam combiners combine the fixed beams into scanning beams. The plurality of variable beam combiners combine the fixed beams into the scanning beams. The variable beam combiners are controlled to scan the scanning beams in a second angular direction.

Further, in carrying out the above objects and other objects, the present invention provides a method for scanning beams of an antenna in only one common angular direction. The method includes providing a plurality of component beams. The component beams are then combined into fixed beams. The component beams are combined in a first angular direction to form the fixed beams. The fixed beams are then variably combined into scanning beams to scan the scanning beams in a second angular direction.

The advantages accruing to the present invention are numerous. The antenna scans only in one angular direction allowing it to be simpler and less expensive than an antenna that scans in both angular directions. Low sidelobes are achieved using a fixed distribution among multiple feed elements in the non-scanning direction. Low sidelobes and beam motion in the scanning plane are achieved using a relatively small number of amplitude/phase weights. Further, the antenna provides independent control of each beam within its scanning range.

These and other features, aspects, and embodiments of the present invention will become better understood with regard to the following description, appended claims, and accompanying drawings.

BRIEF DESCRIPTION OF THE DRAWINGS

FIG. 6A illustrates a side view of one of a pair of unmatched waveguide junctions;

FIG. 6B illustrates the top view of the three input horn apertures of each of the unmatched waveguide junctions;

FIG. 6C illustrates the output ports of each of the unmatched waveguide junctions;

FIG. 6D illustrates a side view of the unmatched waveguide junctions;

FIGS. 6E, 6F, and 6G illustrate other views of the unmatched waveguide junctions;

FIG. 7 illustrates the beam scanning method for scanning beams along an angular direction in accordance with the present invention;

BEST MODE FOR CARRYING OUT THE INVENTION

Although the term "receive" has been used in various places herein, those skilled in the art will recognize that reciprocity dictates an identical or at least similar operation in a transmit mode. Therefore, the term receive is used in those instances only for convenience of description and may in fact include the operation of transmit.

Figure 1A:
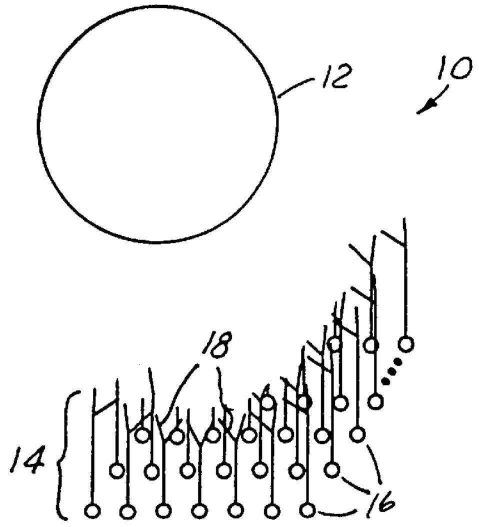
FIGS. 1A, 1B, 1C, and 1D illustrate antennas for generating a set of component beams in accordance with the present invention.

Low sidelobe scanning beams are formed by combining several fixed beams. The fixed beams are formed by combining smaller beams called component beams. Sets of fixed and sets of commandable variable weighting/combining circuits combine the component beams into scanning beams. Referring now to FIGS. 1A, 1B, 1C, and 1D, examples of antennas that generate component beams for use in the present invention are shown. FIG. 1A illustrates an antenna 10 having a spherical dielectric lens 12 and a two dimensional array of feed elements 14. Each of feed elements 14 provide a component beam from a feed aperture input 18 to an output 16. Power received at output 16 has an associated antenna pattern with a maximum response in a particular direction in space. A different radiating output 16 has an associated antenna pattern with a maximum response in a different direction in space.

Figure 1B:
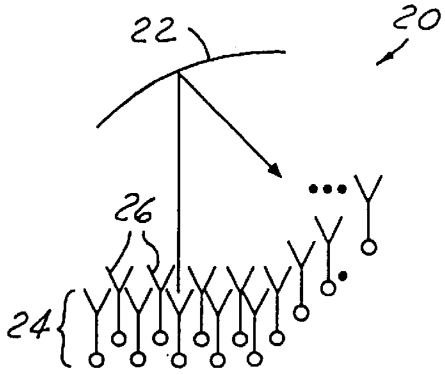

FIG. 1B illustrates an antenna 20 having a reflector 22 and a two dimensional array of feed elements 24. A radiating output 26 of each feed element 24 transmits power to reflector 22 which reflects the power toward earth.

Figure 1C:
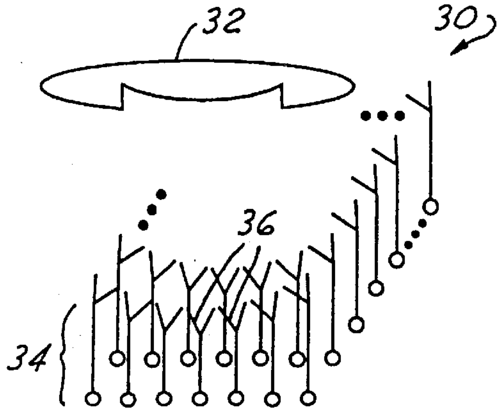

FIG. 1C illustrates an antenna 30 having a thin dielectric lens 32 and a two dimensional array of feed elements 34. A radiating output 36 of each feed element 34 transmits power to thin dielectric lens 32. A waveguide lens or other subdivisions of general lenses that are not thin could be used in place of thin dielectric lens 32.

Figure 1D:
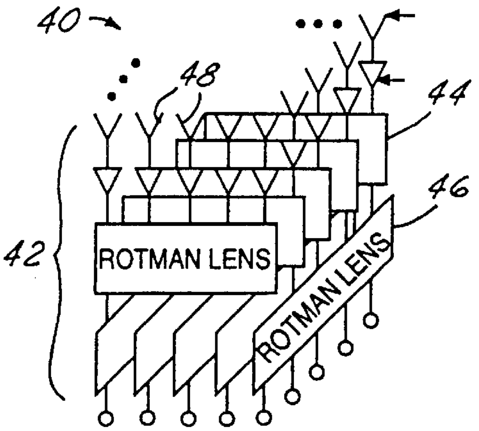

FIG. 1D illustrates an antenna 40 having a two dimensional array of feed elements 42. Each dimension of feed elements 42 has a corresponding pair of Rotman lens sets 44 and 46. A radiating output 48 of each feed element transmits power towards earth. Rotman lens sets 44 and 46 could also be Butler matrices which have a more specific phase distribution than Rotman lenses.

Figure 2:
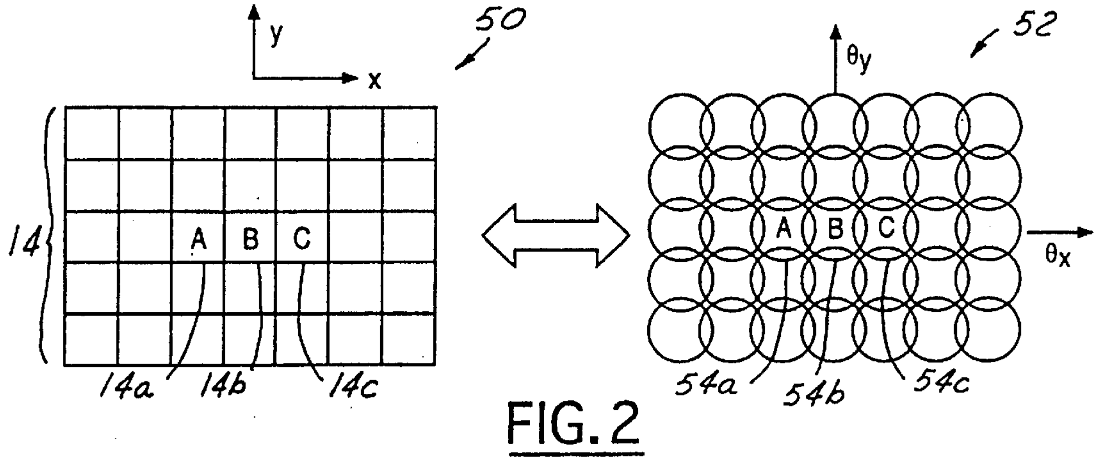
FIG. 2 illustrates a mapping between feed location and component beam direction.

Referring now to FIG. 2, a mapping between feed location and component beam direction is shown. Feed location map 50 includes an x-axis and a y-axis which correspond to a two dimensional array of feed elements such as feed elements 14. The two dimensional array is shown as a square lattice. Feed elements could be arranged in other two dimensional array lattices such as a triangular lattice or could be arranged in curved lines. The mapping is more generally between outputs 16 and the component beam direction. For antennas 10, 20, and 30, each feed element corresponds to an output. For antenna 40, each output maps to all of feed elements 42.

The position of feed elements 14*a*, 14*b*, and 14*c* are shown on feed location map 50. Feed elements 14*a*, 14*b*, and 14*c* receive beams which are shown by component beam direction map 52 as component beams 54*a*, 54*b*, and 54*c*. Component beam direction map 52 includes angular $\theta_x$ and $\theta_y$ directions.

Figure 3:
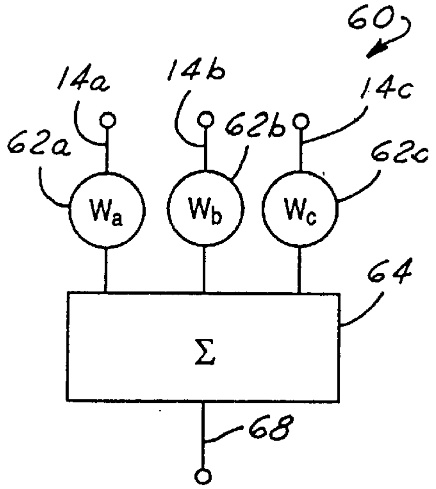
FIG. 3 illustrates a fixed weighting/combining circuit for combining the component beams in accordance with the present invention.
Figure 4:
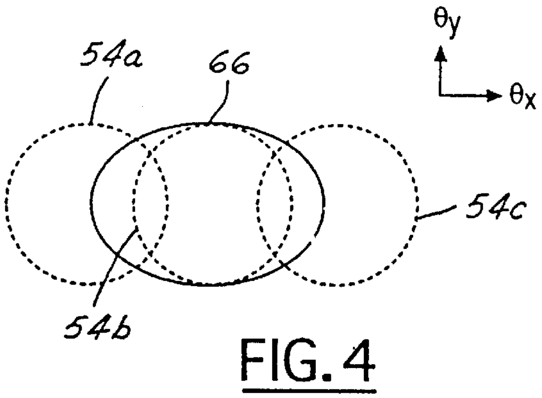
FIG. 4 illustrates three component beams input into the fixed weighting/combining circuit shown in FIG. 3 and the combined fixed beam output from the fixed weighting/combining circuit.

Referring now to FIGS. 3 and 4, if a scanning beam is to be scanned in the $\theta_y$ direction only, fixed weighting/combining is used to combine the component beams in the $\theta_x$ direction. Specifically, a fixed weighting/combining circuit 60 combines the component beams from feed elements 14*a*, 14*b*, and 14*c* into a fixed beam 66. Each feed element 14*a*, 14*b*, and 14*c* includes a respective weighting element 62*a*, 62*b*, and 62*c*. Weighting elements 62*a*, 62*b*, and 62*c*amplitude and phase weight each of component beams 54*a*, 54*b*, and 54*c* from feed elements 14*a*, 14*b*, and 14*c*, respectively. A summation unit 64 combines all of the weighted component beams 54*a*, 54*b*, and 54*c* to form a fixed beam 66 with low sidelobes in the $\theta_x$ direction at fixed beam output 68.

Figure 5A:
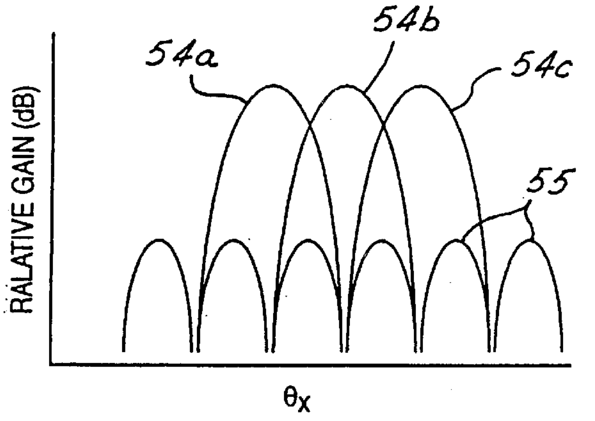
FIGS. 5A and 5B are graphs illustrating the relative gains of the component beams and the fixed beam, respectively.
Figure 5B:
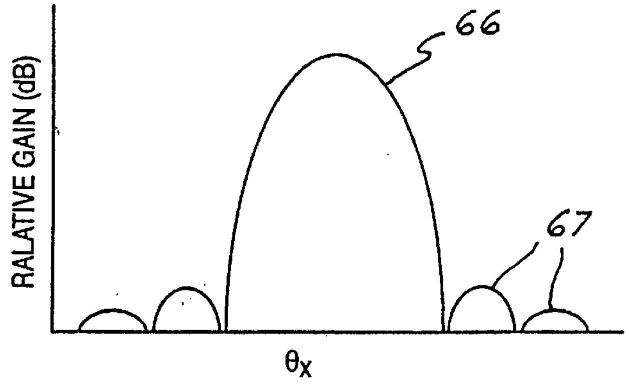

Referring now to FIGS. 5A and 5B, graphs illustrating the relative gains of component beams 54*a*, 54*b*, and 54*c*, and of fixed beam 66 along the $\theta_x$ direction are shown. As shown, the relatively narrow, high-sidelobe component beams 54*a*, 54*b*, and 54*c* combine into the broader, low-sidelobe fixed beam 66. High sidelobes 55 are shown in FIG. 5A and low sidelobes 67 are shown in FIG. 5B.

Referring now to FIGS. 6A, 6B, 6C, and 6D with continual reference to FIG. 3, a fixed weighting/summation device 60 for combining component beams into a fixed beam is shown. As an example, fixed weighting/summation unit 60 combines three component beams into a fixed beam for each of the two senses of circular polarization. With specific reference to FIG. 6B, fixed weighting/summation unit 60 includes a set of three input horn apertures 70*a*, 70*b*, and 70*c*. Horn aperture 70*a* corresponds to feed element 14*a* and provides a signal to weighting element 62*a*. Similarly, horn aperture 70*b* corresponds to feed element 14*b* and provides a signal to weighting element 62*b*. Horn aperture 70*c* is likewise arranged.

With specific reference to FIGS. 6A and 6B, each set of horn apertures is connected to a respective 3:1 unmatched waveguide junction 74 and 76 by respective septum polarizers 78*a*, 78*b*, and 78*c*. There is an unmatched waveguide junction for each of the two circular polarizations (only one of which is visible in FIG. 6A). Septum polarizers 78*a*, 78*b*, and 78*c* separate the signals received from horn apertures 70*a*, 70*b*, and 70*c* into right (or left) hand circular polarization signals. The specific shapes (i.e., the number, length, and height of the steps) of the septum polarizers 78*a*, 78*b*, and 78*c* are chosen for the desired circular polarization properties over the frequency band of operation. Unmatched waveguide junction 74 then combines the right hand circular polarization outputs from horn apertures 70*a*, 70*b*, and 70*c* with the proper amplitude and phase into a right hand circular polarization fixed beam. Likewise, unmatched waveguide junction 76 combines the left hand circular polarization outputs from horn apertures 70*a*, 70*b*, and 70*c* with the proper amplitude and phase into a left hand circular polarization fixed beam.

With specific reference to FIG. 6C, the right hand circular polarization fixed beam from unmatched waveguide junction 74 is output at junction output port 80. Similarly, the left hand circular polarization fixed beam from unmatched waveguide junction 76 is output at junction output port 82.

Junction output ports 80 and 82, one for each polarization, are realized in a conventional waveguide. Of course, there are other ways of achieving dual circular polarized beams. Other configurations can be used if orthogonal linear polarizations are required.

Once the fixed portion of the combining is complete, the fixed beams are further combined using commandable variable beam combiners to form the scanning beams. The commandable variable beam combiners are similar to the fixed weighting/combiner circuit discussed above and amplitude and phase weight the fixed beams. The weighting elements of the variable beam combiners are adjusted via commands from an antenna controller (not specifically shown). The variable beam combiner then combines the fixed beams to form and scan the scanning beams.

Referring now to FIG. 7, the beam scanning method in accordance with the present invention is shown. At time TO, scanning beam 84 is formed by weighting/combining fixed beams 1, 2, 3, and 4. The weighting/combining controls not only the position of scanning beam 84 but also the sidelobe behavior. A typical set of amplitude weights for fixed beams 1, 2, 3, and 4 might be in the ratio of 1:4:1:0 to form a low sidelobe located at fixed beam 2. Likewise, scanning beam 86 is formed from fixed beams 3, 4, 5, and 6. Scanning beam 88 is formed from fixed beams 5, 6, 7, and 8, etc.

At a later time T1, scanning beams 84, 86, and 88 can be scanned to the shown positions by commanding the weights in the weighting/combining circuits associated with each scanning beam. For example, scanning beam 84 can be repositioned by using a set of amplitude weights of 1/2:2:2:1/2 for fixed beams 1, 2, 3, and 4. The beam maximum of scanning beam 1 would then be repositioned to a location between fixed beams 2 and 3 as shown. Similarly, the beam maximum of scanning beam 86 can be repositioned to a location between fixed beams 4 and 5, etc.

At a later time T2, scanning beam 84 has been scanned to a location over fixed beam 3 using weights in the ratio of 0:1:4:1 for fixed beams 1, 2, 3, and 4. In general, the weighting is complex, i.e., both amplitude and phase are controlled. It is possible that amplitude only weights may be employed provided the required sidelobe levels are not too low.

Figure 8:
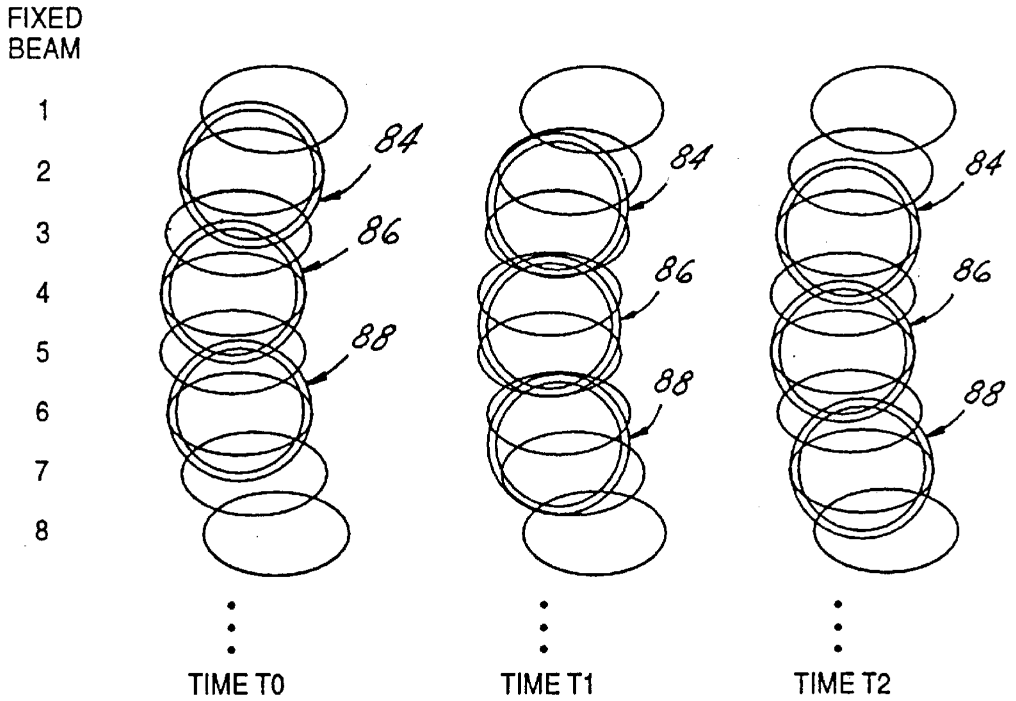
FIG. 8 illustrates the beam scanning method for scanning beams along an angular path in accordance with the present invention.

FIG. 7 illustrates the scanning beams scanned along a straight linear angular direction. Of course, the scanning beams may be scanned along a curved angular path as shown in FIG. 8. This means that the fixed beams would not be placed along a straight line as shown in FIG. 7, but would be placed along a shallow arc. The shallow arc corresponds to the motion of cells or users.

Figure 9:
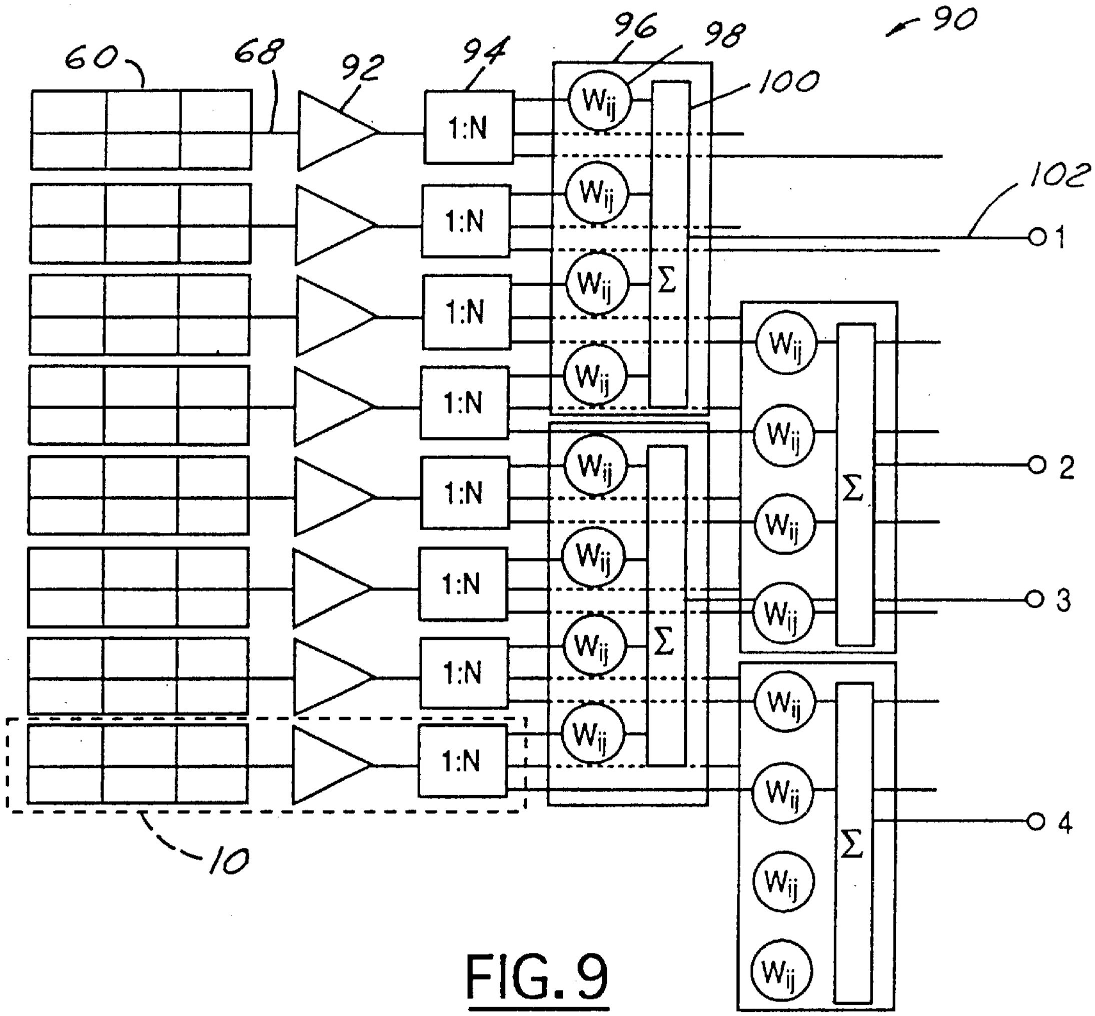
FIG. 9 illustrates a block diagram of an antenna in accordance with the present invention.

Referring now to FIG. 9, an antenna 90 for carrying out the beam scanning method shown in FIGS. 7 and 8 in accordance with the present invention is shown. Antenna 90 can be designed using any one of the configurations shown in FIGS. 1A, 1B, 1C, and 1D. Antenna 90 includes a plurality of fixed weighting/combining circuits 60. Each of fixed weighting/combining circuits 60 receive either three right or three left circular polarization component beams. Fixed weighting/combining circuits 60 combine the component beams to form right or left hand circular polarization fixed beams. The operation of antenna 90 will now be described with reference to just one of the circular polarization fixed beams.

Figure 10:
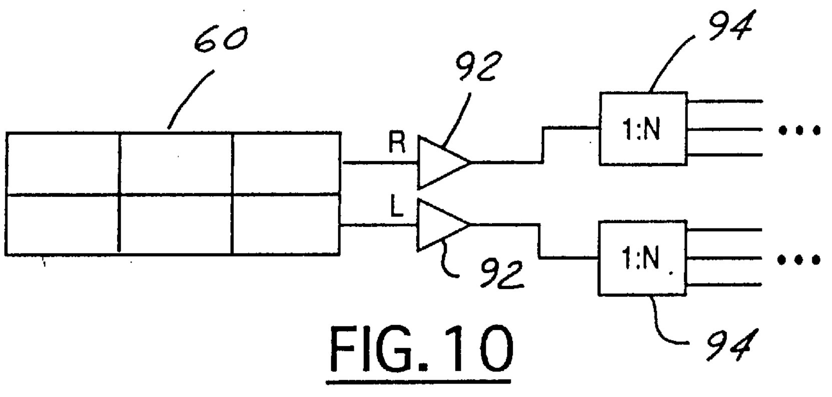
FIG. 10 illustrates a fixed weighting/combining circuit of the antenna shown in FIG. 9 for forming right and left hand circular polarization fixed beams using a separate set of elements for each polarization.

Each of fixed weighting/combining circuits 60 output a fixed circular polarization beam at a respective fixed beam output 68. Each of a plurality of low noise amplifiers (LNA) 92 then amplifies a respective fixed beam from fixed beam outputs 68. LNAs 92 may be needed to provide enough front-end gain to set the noise figure of antenna 90 to a reasonable value since the commandable weighting/combining circuitry that follows may be relatively lossy. A plurality of 1:N splitters 94 then split respective fixed beams into N fixed beams, where N=3 in the example shown in FIG. 8. A plurality of commandable variable beam combiners 96 weight and combine the fixed beams to form low sidelobe scanning beams. Similar to fixed weighting/combining circuits 60, each of variable beam combiners 96 includes a plurality of weighting elements 98 and a summation unit 100. An antenna controller (not specifically shown) controls weighting elements 98 to vary the weighting of variable beam combiners 96. Each weighting element 98 weights a fixed beam and then summation unit 100 combines the weighted fixed beams from the weighting elements. The total amount of scanning range desired and the number of beams desired determine the number of fixed beams, and thus determines the parameter N. Variable beam combiners 96 output a respective scanning beam at variable beam combiner output 102. In this example, antenna 90 includes four variable beam combiners 96 to provide four scanning beams. Referring now to FIG. 10, with reference to FIGS. 6A, 6B, 6C, 6D, 6E, 6F, 6G, and 9, fixed weighting/combining circuit 60 forms right and left hand circular polarization fixed beams using a separate set of elements for each polarization. Each set of elements includes a splitter 94 and a variable beam combiner 96.

Because each beam combiner 96 is independently controlled, the location of each scanning beam can be individually specified. This is important if the scanning rate is required to be a non-linear function of the scan position of the scanning beam when dealing with the curvature of the earth. Specifically, the cells (users) on the surface of the earth move at different angular rates. The cells directly below the satellite move more rapidly than those rising or setting over the horizon.

The advantage of antenna 90 is that all of the scanning beams can be scanned in one only one common angular direction. Accordingly, only n sets of variable beam combiners 96 are required to effect the scanning. If the beams were required to be scanned in both of the angular directions then $n^2$ sets of variable beam combiners would be required. Thus, the present invention teaches the use of the requisite number of components to effect scanning of the scanning beams in only one common angular direction or angular path.

Thus it is apparent that there has been provided, in accordance with the present invention, an antenna that scans multiple beams in only one common angular direction that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An antenna for scanning beams in only one common angular direction, the antenna comprising:

a plurality of feed elements each providing a component beam;

a plurality of fixed beam combiners for combining the component beams into fixed beams, wherein the plurality of fixed beam combiners combine the component beams in a first angular direction $\theta_x$ to form the fixed beams; and a plurality of variable beam combiners for combining the fixed beams into scanning beams, wherein the plurality of variable beam combiners combine the fixed beams into the scanning beams to scan the scanning beams in a second angular direction $\theta_y$ corresponding to an apparent motion of a cell or user.

2. The antenna of claim 1 wherein:

each of the component beams includes a circular polarization component beam.

3. The antenna of claim 2 wherein:

the circular polarization component beam is a right hand circular polarization component beam.

4. The antenna of claim 2 wherein:

the circular polarization component beam is a left hand circular polarization component beam.

5. The antenna of claim 1 wherein:

each of the plurality of fixed beam combiners includes a plurality of weighting circuits for weighting a respective component beam and a summation unit for combining the weighted component beams into a fixed beam.

6. The antenna of claim 1 wherein:

each of the plurality of variable beam combiners includes a plurality of weighting circuits for weighting a respective fixed beam and a summation unit for combining the weighted fixed beams into a scanning beam.

7. The antenna of claim 6 wherein:

each of the weighting circuits of the plurality of variable beam combiners amplitude and phase weight a respective fixed beam.

8. The antenna of claim 1 further comprising:

a splitter associated with each fixed beam combiner for splitting a fixed beam into a plurality of split fixed beams, wherein the plurality of variable beam combiners combine the split fixed beams into the scanning beams.

9. The antenna of claim 1 wherein:

the plurality of variable beam combiners combine the fixed beams into the scanning beams to scan the scanning beams independently of one another in the second angular direction.

10. The antenna of claim 1 wherein:

the plurality of variable claim combiners combine the fixed beams into scanning beams to scan the scanning beams in the second angular direction along a straight line.

11. The antenna of claim 1 wherein:

the plurality of variable beam combiners combine the fixed beams into the scanning beams to scan the scanning beams in the second angular direction along a curved line.

12. A method for scanning beams of an antenna in only one common angular direction, the method comprising:

providing a plurality of component beams;

combining the component beams into fixed beams using a plurality of combiners including only fixed combiners, wherein the component beams are combined in a first angular direction $\theta_x$ to form the fixed beams; and variably combining the fixed beams into scanning beams to scan the scanning beams in a second angular direction $\theta_y$.

13. The method of claim 12 wherein:

each of the component beams include a circular polarization component beam.

14. The method of claim 12 wherein:

the circular polarization component beam is a right hand circular polarization component beam.

15. The method of claim 13 wherein:

the circular polarization component beam is a left hand circular polarization component beam.

16. The method of claim 12 wherein combining the component beams into fixed beams comprises:

weighting each component beam in a set of the plurality of component beams; and combining the weighted component beams in the set of the plurality of component beams into a fixed beam.

17. The method of claim 12 wherein variable combining the fixed beams into scanning beams comprises:

weighting a respective fixed beam in a set of fixed beams; and combining the weighted fixed beams in the set of fixed beams into a scanning beam.

18. The method of claim 17 wherein weighting a respective fixed beam in a set of fixed beams comprises:

weighting an amplitude and phase of the respective fixed beam in a set of fixed beams.

19. The method of claim 12 further comprising:

splitting a fixed beam into a plurality of split fixed beams, wherein the split fixed beams are combined into the scanning beams.

20. The method of claim 12, wherein the second angular direction is oriented to correspond to an apparent motion of cells or users.

21. A satellite communication system comprising:

an antenna for scanning beams in only one common angular direction, the antenna including a plurality of feed elements each providing a component beam, a plurality of fixed beam combiners for combining the component beams into fixed beams, wherein the plurality of fixed beam combiners combine the component beams in a first angular direction $\theta_x$ to form the fixed beams, and a plurality of variable beam combiners for combining the fixed beams into scanning beams, wherein the plurality of variable beam combiners combine the fixed beams into the scanning beams to scan the scanning beams in a second angular direction $\theta_y$ corresponding to an apparent motion of a cell or user.

* * * * *